(12) United States Patent
Tomita et al.

(10) Patent No.: US 8,092,337 B2
(45) Date of Patent: Jan. 10, 2012

(54) COMPOSITE PLANETARY GEAR APPARATUS

(75) Inventors: Makoto Tomita, Nagoya (JP); Eiji Ichioka, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 298 days.

(21) Appl. No.: 12/393,535

(22) Filed: Feb. 26, 2009

(65) Prior Publication Data

US 2009/0233749 A1   Sep. 17, 2009

(30) Foreign Application Priority Data

Mar. 11, 2008 (JP) ................................ 2008-061093

(51) Int. Cl.
*F16H 57/08* (2006.01)
(52) U.S. Cl. ........................................................ 475/344
(58) Field of Classification Search .............. 475/5, 159, 475/160, 331, 334; 74/467, 468
See application file for complete search history.

(56) References Cited

U.S. PATENT DOCUMENTS

| | | | |
|---|---|---|---|
| 4,158,972 A * | 6/1979 | Chamberlain | 475/337 |
| 6,223,616 B1 * | 5/2001 | Sheridan | 74/468 |
| 7,591,754 B2 * | 9/2009 | Duong et al. | 475/347 |
| 2008/0044276 A1 * | 2/2008 | McCune et al. | 415/122.1 |

FOREIGN PATENT DOCUMENTS

| | | |
|---|---|---|
| JP | 7-19320 | 1/1995 |
| JP | 2005-308094 | 11/2005 |
| JP | 2006-83986 | 3/2006 |

* cited by examiner

*Primary Examiner* — Justin Holmes
*Assistant Examiner* — Huan Le
(74) *Attorney, Agent, or Firm* — Oblon, Spivak, McClelland, Maier & Neustadt, L.L.P.

(57) ABSTRACT

The composite planetary gear apparatus according to the present invention can bring about an advantageous effect to prevent fuel efficiency from being lowered stemming from the increased stirring loss of oil. The apparatus comprises a first planetary gear assembly 11 having a sun gear S1, pinion gears P1, and a ring gear R1, and a second planetary gear assembly 12 having a sun gear S2, pinion gears P2, and a ring gear R2. The ring gears R1 and R2 surround the pinion gears P1 and P2 and are combined together to integrally form a counter drive gear 13. The counter drive gear 13 is formed with a plurality of through bores 13c each having an inner end opened at a closed space defined by the first and second planetary gear assemblies 11 and 12, and an outer end opened at an outer space surrounding the counter drive gear 13.

9 Claims, 5 Drawing Sheets

COMPOSITE PLANETARY GEAR APPARATUS

BACKGROUND OF THE INVENTION

1. Field of the Invention

The present invention relates to a composite planetary gear apparatus, and in particular to a composite planetary gear apparatus incorporating therein two planetary gear assemblies for reduction of the rotation speed of a drive power shaft having a drive power outputted by an engine.

2. Description of the Background Art

Up until now, there has been known as a prior-art composite planetary gear apparatus of this kind an apparatus to be mounted on a hybrid automotive vehicle, for example, by a following patent document. The known composite planetary gear apparatus is constituted by a first planetary gear assembly used for reduction of the output speed of a drive motor, and a second planetary gear assembly having a drive power distribution function to distribute a drive power outputted from an engine to a motor generator and to a counter drive gear serving as an integral part of outer ring member. The first planetary gear assembly and the second planetary gear assembly have sun gears and pinion gears, respectively, and have a common counter drive gear having a pair of inner teeth formed in coaxial relationship with the respective sun gears and held in mesh with the respective pinion gears and outer teeth formed on the outer peripheral portion thereof.

The conventional composite planetary gear apparatus is constructed as being supplied with an oil circulated from a catch tank and an oil pumped from an oil pump through a plurality of oil passageways formed in rotation shafts, respectively, in the sun gears, to be held in communication with the inner peripheral surfaces of the sun gears, respectively, and then having the oil from the catch tank and the oil pump to be stirred with the rotations of a plurality of gears constituting the composite planetary gear apparatus for the purpose of lubricating parts and elements forming part of the composite planetary gear apparatus.

More specifically, there is shown in FIG. 5 a composite planetary gear apparatus 80 which comprises a first gear assembly 81 and a second gear assembly 82 forming in combination a closed space A1 in a counter drive gear 83. The closed space A1 is adapted to be fed with oil from a catch tank and an oil pump as shown by the arrows F1 and F2 in FIG. 5. The respective rotations of ring gears R1, R2 and pinion gears P1, P2 cause the oil to be stirred in the closed space A1 for lubricating the parts and elements forming the composite planetary gear apparatus 80.

Patent Document: Laying-open patent publication No. 2005-308094

The conventional composite planetary gear apparatus 80, however, encounters such a problem that when the oil is fed into the composite planetary gear apparatus 80, the oil entered the closed space A1 is radially outwardly urged by the centrifugal force of the oil toward the inner peripheral surface of the counter drive gear 83 by the reason that the first gear assembly 81 and the second gear assembly 82 forms in combination the closed space A1 in the counter drive gear 83. The radially outwardly urged oil is difficult to be discharged out of the closed space A1 and remains stagnantly in the closed space A1. As a consequence, the stagnantly remaining oil leads to imparting resistance to the rotations of the planetary gears, thereby resulting in increasing the stirring loss and lowering fuel efficiency of the engine.

SUMMARY OF THE INVENTION

The present invention has been made to solve these problems encountered by the conventional composite planetary gear apparatus. It is, therefore, an object of the present invention to provide a composite planetary gear apparatus which can prevent the fuel efficiency from being lowered stemming from the increased stirring loss of the oil to be fed to the composite planetary gear apparatus.

For achieving the above object of the present invention, the composite planetary gear apparatus according to the first aspect of the present invention comprises (1) a first planetary gear assembly including a first sun gear, a plurality of first pinion gears held in mesh with the first sun gear, and a first outer ring member having inner teeth held in mesh with the first pinion gears, and a second planetary gear assembly including a second sun gear arranged in axial alignment with the first sun gear, a plurality of second pinion gears held in mesh with the second sun gear, and a second outer ring member having inner teeth held in mesh with the second pinion gears, in which the first outer ring member and the second outer ring member are integrally formed to constitute as a whole an integral outer ring member surrounding the first pinion gears and the second pinion gears and surrounded by an outer space, the integral outer ring member is formed with a plurality of through bores radially extending, and the first planetary gear assembly and the second planetary gear assembly collectively define a closed space held in communication with the outer space through the through bores.

In the composite planetary gear apparatus described above, the communication through the through bores between the closed space defined by the first planetary gear assembly and the second planetary gear assembly and the outer space makes it possible to discharge the oil fed to the composite planetary gear apparatus and accumulated in the closed space to the outer space by way of the through bore with the centrifugal force generated with the operations of the first planetary gear assembly and the second planetary gear assembly so that the oil is prevented from being accumulated in the closed space. This means that the composite planetary gear apparatus is by no means affected with the oil resistance to prevent the stirring loss from being increased and thus to prevent the fuel efficiency from being lowered.

According to the second aspect of the present invention, in the composite planetary gear apparatus (1) described as above, (2) the integral outer ring member may have an inner peripheral surface portion formed with an annular groove, each of the through bores having one end opened at the bottom surface of the annular groove and the other end opened at the outer peripheral surface of the integral outer ring member.

In the composite planetary gear apparatus described above, the radially inner end of each of the through bores opened at the axially intermediate inner peripheral surface portion of the bottom surface of the annular groove causes the oil to be radially outwardly urged toward the inner peripheral surface of the integral outer ring member and collected in the annular groove by the centrifugal force generated with the operation of the composite planetary gear apparatus, thereby making it possible to effectively discharge the oil to the outer space of the integral outer ring member from the closed space in the integral outer ring member.

According to third aspect of the present invention, in the composite planetary gear apparatus (2) described as above, (3) at least one planetary gear assembly may be selected from among the first planetary gear assembly and the second planetary gear assembly, in which the sun gear, the pinion gears, and the inner teeth of the selected planetary gear assembly are each formed by a helical gear, the annular groove to have a bottom surface and a pair of side surfaces connected to the bottom surface at their respective corner portions, and one end of each of the through bores is opened in the vicinity of one of the corner portions.

In the composite planetary gear apparatus described above, the gears are each formed in the form of a helical gear and the annular groove has a bottom surface and a pair of side surfaces connected to the bottom surface at their respective corner portions so that the oil is scooped up in the radially outward and axially inclined direction and is easily collected in the vicinity of the corner portion of the annular groove, and effectively discharged to the outer space of the integral outer ring member through the through bores.

According to the fourth aspect of the present invention, in the composite planetary gear apparatus described (1) as above, (4) the other end of each of the through bores may be opened at the radially outermost position in the outer peripheral surfaces of the integral outer ring member.

In the composite planetary gear apparatus described above, the oil passing through the through bores is imparted an augmented large centrifugal force, thereby making it possible for a larger amount of oil to be discharged.

Accordingly, the present invention can provide a composite planetary gear apparatus capable of preventing the fuel efficiency from being lowered stemming from the increased stirring loss of the oil to be fed to the composite planetary gear apparatus.

BRIEF DESCRIPTION OF THE DRAWINGS

The foregoing and other objects, features, aspects and advantages of the present invention will become more apparent from the following detailed description of the present invention when taken in conjunction with the accompanying drawings, wherein.

DETAILED DESCRIPTION OF THE PREFERRED EMBODIMENT

Figure 1:
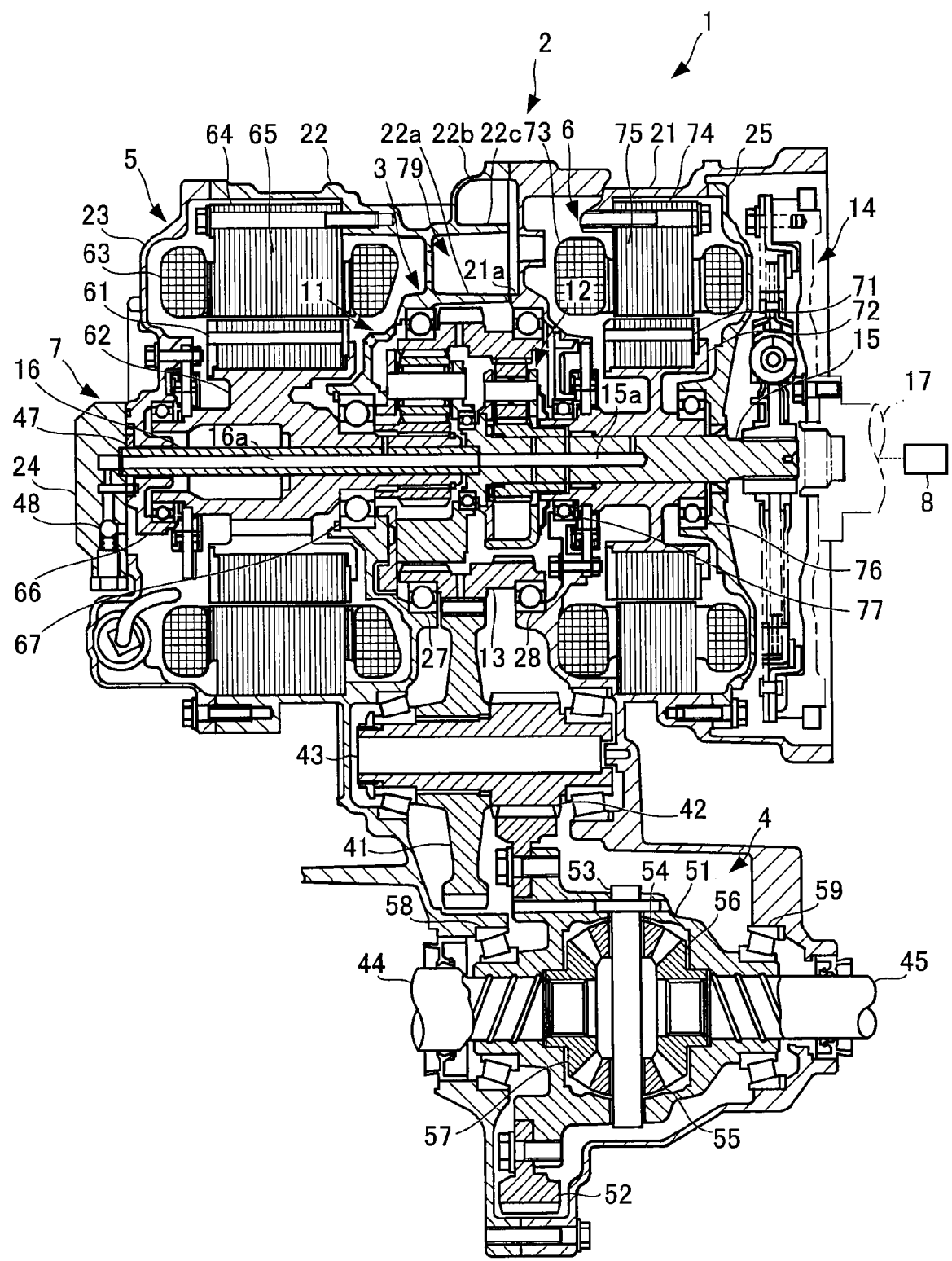
FIG. 1 is a cross-sectional view of a drive power transmission apparatus, showing a first embodiment of a composite planetary gear apparatus according to the present invention.
Figure 2:
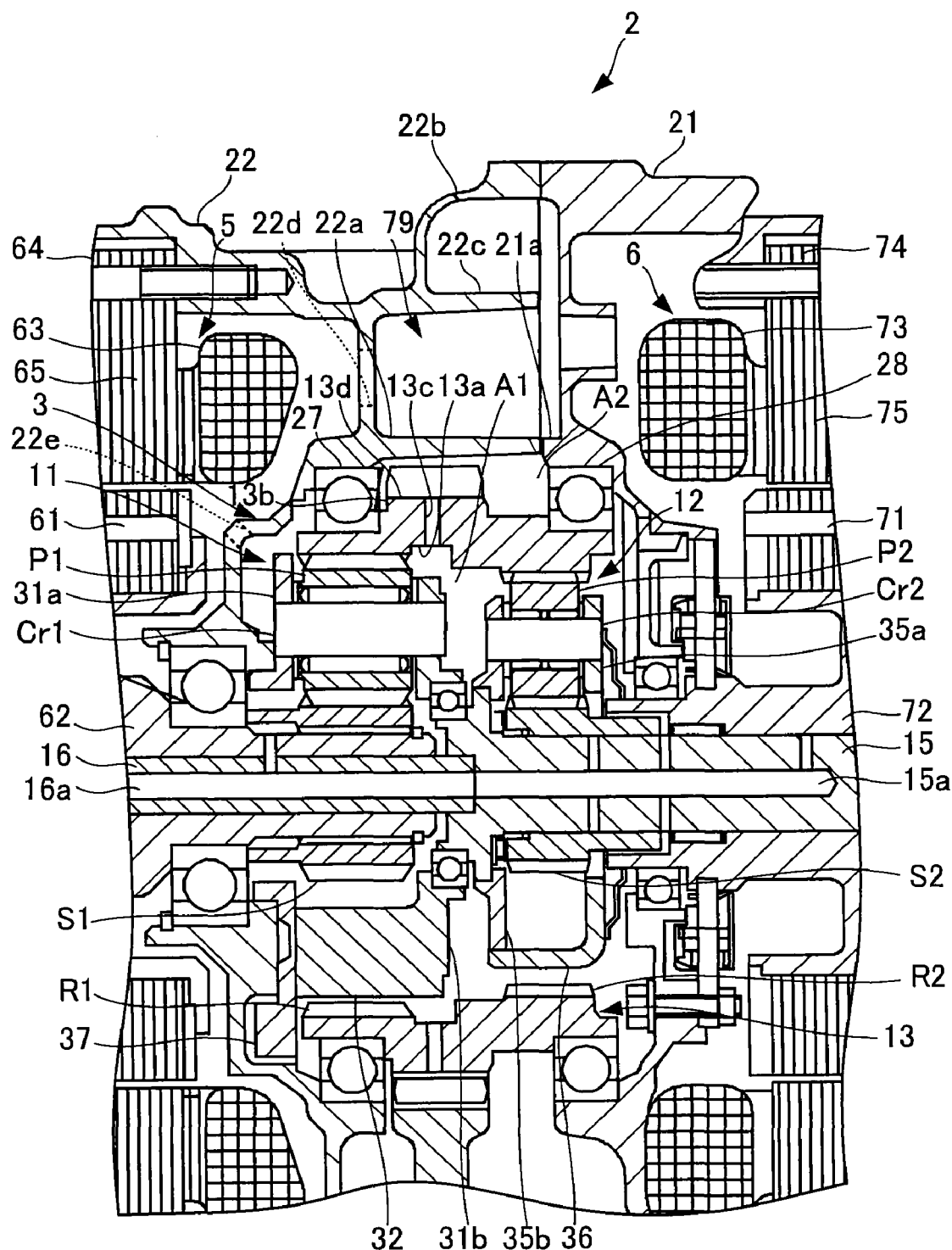
FIG. 2 is an enlarged and fragmentary cross-sectional view of FIG. 1, showing the first embodiment of the composite planetary gear apparatus according to the present invention.
Figure 3:
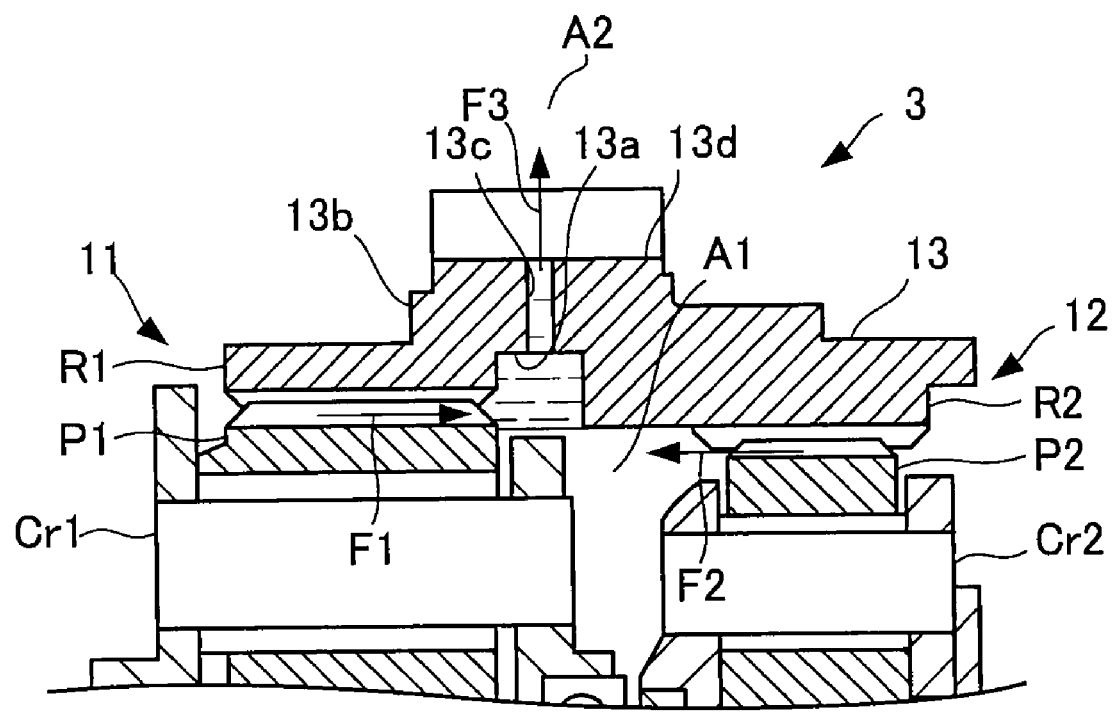
FIG. 3 is an enlarged and fragmentary cross-sectional view of FIG. 2 for explaining the oil stirring operation to be carried out in the first embodiment of the composite planetary gear apparatus according to the present invention.

Now, one preferred embodiment of the present invention will be described with reference to accompanying drawings. FIGS. 1 through 3 are views showing an example of a composite planetary gear apparatus according to a first embodiment of the present invention applied to a drive power transmission apparatus for front-wheel drive of a four-wheel drive vehicle.

First Embodiment

FIG. 1 is a cross-sectional view of a drive power transmission apparatus, showing a first embodiment of a composite planetary gear apparatus according to the present invention. FIG. 2 is an enlarged and fragmentary cross-sectional view of FIG. 1, showing the first embodiment of the composite planetary gear apparatus according to the present invention.

In FIGS. 1 and 2 is shown a drive power transmission apparatus 1 which comprises a transmission case 2 accommodating therein a composite planetary gear apparatus 3 constituting part of a change speed mechanism, a differential apparatus 4 capable of outputting differential output drive powers to respective front drive shafts 44 and 45, a drive motor 5 for driving an automotive vehicle with an electric power accumulated in a battery, a motor generator 6 capable of generating the electric power with a drive power outputted by an engine 8, and an oil pump 7 for pumping and feeding an oil to the parts and elements forming the drive power transmission apparatus 1.

The composite planetary gear apparatus 3 comprises a first planetary gear assembly 11 for transmitting the drive power outputted by the drive motor 5, and a second planetary gear assembly 12 for transmitting the drive power outputted by the engine 8 so that the composite planetary gear apparatus 3 can selectively transmit the drive powers outputted by the drive motor 5 and the engine 8 to the differential apparatus 4 by way of the first planetary gear assembly 11 and the second planetary gear assembly 12. The explanation about the detailed construction of the composite planetary gear apparatus 3 will become apparent as the description proceeds.

The transmission case 2 includes a housing 21 having one side portion, i.e., an engine side portion securely connected to the engine 8, and a case 22 having one side portion securely connected to the other side portion of the housing 21 in opposing relationship with the engine side portion of the housing 21. The case 22 has the other side portion in opposing relationship with the one side portion of the case 22 and attached with one side portion of a case cover 23. The case cover 23 has the other side portion in opposing relationship with the one side portion of the case cover 23 and is attached with an oil pump cover 24.

The housing 21 is attached with a housing cover 25 which serves to divide the housing 21 into two spaces, i.e., a first space accommodating therein the parts and elements including the motor generator 6 and a second space accommodating therein the parts and elements forming a damper mechanism 14 for transmitting the drive power from the engine 8 to the composite planetary gear apparatus 3.

The thus constructed housing 21, the case 22, the case cover 23, and the housing cover 25 constitutes as a whole the transmission case 2 having a closed space accommodating therein the composite planetary gear apparatus 3, the differential apparatus 4, the drive motor 5 and the motor generator 6 as will be understood from the foregoing description.

The case 22 is formed with an annular bottomed compartment portion 22a surrounding the outer peripheral portion of the composite planetary gear apparatus 3 and attached with a bearing 27 allowing the case 22 to rotatably support therethrough one end of a counter drive gear 13 forming part of the composite planetary gear apparatus 3. The counter drive gear 13 will be described in detail hereinafter.

The housing 21 is formed with an annular thick portion 21a held in abutment engagement with the annular bottomed compartment portion 22a, the annular thick portion 21a and the annular bottomed compartment portion 22a forming in combination a closed space accommodating therein the parts and the elements of the composite planetary gear apparatus 3. The annular thick portion 21a is attached with a bearing 28 allowing the housing 21 to rotatably support therethrough the other end of the counter drive gear 13 forming part of the composite planetary gear apparatus 3.

The motor generator 6 and the second planetary gear assembly 12 have a common rotation center portion allowing an input shaft 15 to extend through the motor generator 6 and the second planetary gear assembly 12. The drive motor 5 and the first planetary gear assembly 11 have a common rotation center portion allowing an oil pump drive shaft 16 to extend through the drive motor 5 and the first planetary gear assembly 11.

The input shaft 15 has one end portion drivably engageable with a crank shaft 17 so that the input shaft 15 can be rotated together with the crank shaft 17 when the input shaft 15 is engaged with the crank shaft 17 and not rotated together with the crank shaft 17 when the input shaft 15 is disengaged from the crank shaft 17, while the input shaft 15 has the other end portion drivably connected to the second planetary gear assembly 12 so that the drive power from the engine 8 can be transmitted to the composite planetary gear apparatus 3.

The oil pump drive shaft 16 has one end portion drivably engageable with the input shaft 15 to ensure that the oil pump drive shaft 16 is engaged with and thus rotated together with the input shaft 15, while the oil pump drive shaft 16 has the other end portion securely connected to the oil pump 7 to ensure that the drive power from the input shaft 15 is transmitted to the oil pump 7.

The transmission case 2 has a counter driven gear 41 and a final drive gear 42 accommodated therein to permit the counter driven gear 41 and the final drive gear 42 to transmit the drive power outputted from the composite planetary gear apparatus 3 to the differential apparatus 4.

The counter driven gear 41 is held in mesh with a counter drive gear 13 and splined to the final drive gear 42 securely supported on a counter shaft 43. The detailed explanation about the counter drive gear 13 will be made hereinafter.

The differential apparatus 4 is provided with a hollow differential case 51 which is rotatably supported by the case 22 and the housing 21 through bearings 58 and 59.

The differential case 51 has an outer peripheral portion securely connected with a final gear 52 held in mesh with the final drive gear 42 so that the drive power outputted from the composite planetary gear apparatus 3 can be transmitted to the differential case 51 through the counter driven gear 41 and the final drive gear 42.

The differential case 51 has a pinion gear shaft 53 accommodated therein and rotatably supports the pinion gear shaft 53. The pinion gear shaft 53 securely supports a pair of differential pinion gears 54 and 55.

The differential pinion gears 54 and 55 are respectively held in mesh with side gears 56 and 57 securely supported on the front drive shafts 44 and 45, respectively. The front drive shafts 44 and 45 are drivably connected with respective front wheels not shown. The function of the differential apparatus 4 having the mentioned gears 54, 55, 56 and 57 are well known in the art and thus will not be explained in detail hereinafter.

The drive motor 5 comprises a rotor 62 provided with a permanent magnet 61 and a stator 64 wound with a three-phase coil 63 which functions as a permanent magnet synchronous electric motor. The rotor 62 is formed with a through bore and rotatably supported on the case 22 and the case cover 23 with bearings 66 and 67, respectively, under the state that the oil pump drive shaft 16 passes through the through bore.

The motor generator 6 comprises a rotor 72 provided with a permanent magnet 71 and a stator 74 wound with a three-phase coil 73 which functions as a permanent magnet synchronous electric generator motor in a similar manner to the drive motor 5. The rotor 72 is formed with a through bore and rotatably supported on the housing 21 and the housing cover 25 with bearings 76 and 77, respectively, under the state that the input shaft 15 passes through the through bore.

The rotor 62 of the drive motor 5 is arranged with respect to the stator 64 of the drive motor 5 with a slight annular space between the outer peripheral surface of the rotor 62 and the inner peripheral surface of the stator 64 so that a magnetic field can be generated passing through the rotor 62 and the stator 64. On the other hand, the rotor 72 of the motor generator 6 is arranged with respect to the stator 74 of the motor generator 6 with a slight annular space between the outer peripheral surface of the rotor 72 and the inner peripheral surface of the stator 74 so that a magnetic field can be generated passing through the rotor 72 and the stator 74.

The stators 64 and 74 of the drive motor 5 and the motor generator 6 are omitted in the drawings over their detailed constructions, but respectively comprise yokes 65 and 75 each having a multiplicity of annular magnetic plates stacked together. Each of the annular magnetic plates has a plurality of radial grooves and a plurality of stator teeth circumferentially equidistantly formed between the adjacent radial grooves. The stacked annular magnetic plates have a plurality of three-phase coils 63 and 73 each surrounding around each of the stator teeth and received in each of the radial grooves.

The oil pump 7 comprises a drive rotor 47 securely supported on the oil pump drive shaft 16 and a driven rotor not shown. The driven rotor is rotatably supported on the case cover 23.

The oil pump cover 24 has a relief valve 48 housed therein to carry out an oil pressure control so that the oil pressure of the oil can be maintained below the predetermined pressure level set by the relief valve 48.

The oil pump drive shaft 16 and the input shaft 15 are respectively formed with a plurality of oil passageways which serve to distribute oil pumped from the oil pump 7 to the parts and elements forming the drive power transmission apparatus 1.

More specifically, the oil pump drive shaft 16 is formed with a through bore, i.e., an oil passageway 16a axially extending and a plurality of divergent oil passageways communicating the oil passageway 16a and the exterior of the oil pump drive shaft 16, while the input shaft 15 is similarly formed with a through bore, i.e., an oil passageway 15a axially extending and held in communication with the oil passageway 16a and a plurality of divergent oil passageways communicating the oil passageway 15a and the exterior of the input shaft 15. This means that the oil pumped from the oil pump 7 can be distributed to the parts and elements forming the drive power transmission apparatus 1 by way of the divergent oil passageways when the oil is pumped from the oil pump 7 to the oil passageways 15a and 16a. The reference numerals of the divergent oil passageways of the input shaft 15 and the oil pump drive shaft 16 are omitted in the drawings.

It is, therefore, understood that the oil pump 7, the oil pump drive shaft 16, and the input shaft 15 thus constructed make it possible to allow oil pumped by the oil pump 7 to be distributed to the whole parts and elements forming the drive power transmission apparatus 1 through the oil passageways 15a, 16a and the divergent oil passageways under the state that the oil pressure of the oil is maintained below the predetermined pressure level set by the relief valve 48.

In addition to the annular compartment portion 22a previously mentioned, the case 22 has an outer peripheral wall portion 22b radially spaced apart from and surrounding the outer peripheral portion of the annular compartment portion 22a, and a compartment portion 22c axially extending half way to the wall portion forming part of the housing 21 between the annular compartment portion 22a and the outer peripheral wall portion 22b. The annular compartment portion 22a, the outer peripheral wall portion 22b, and the compartment portion 22c collectively define a catch tank 79 capable of accumulating a predetermined amount of oil therein. The case 22 is shown in FIG. 2 as being formed with oil passageways 22d and 22e adapted to supply the oil in the catch tank 79 to the parts and elements of the composite planetary gear apparatus 3.

The differential apparatus 4 in the case 22 has a space for accumulating the oil fed from the oil pump 7 to the differential apparatus 4 to have the lower portion of the final gear 52 immersed therein. It is thus to be noted that the oil accumulated in the space of the differential apparatus 4 can be scooped up and scattered by the final gear 52 driven to rotate when the automotive vehicle is operated.

The oil scooped and scattered as above can lubricate the counter drive gear 13, the counter driven gear 41, the final drive gear 42, and the bearings rotatably supporting the gears 13, 41, 42, while part of the oil can be flowed to the catch tank 79 along the inner wall of the case 22.

The oil accumulated in the catch tank 79 is designed to be fed to the engaging portions of each of the gears constituting the composite planetary gear apparatus 3 by a small amount thereof.

From the foregoing description, it will be understood that the composite planetary gear apparatus 3 is supplied with the oil pumped by the oil pump 7 through the oil passageways 15a, 16a respectively formed in the input shaft 15 and the oil pump drive shaft 16, while being fed from the catch tank 79 to the composite planetary gear apparatus 3 through the oil passageways 22d and 22e.

Here, the detailed description about the composite planetary gear apparatus 3 will be made with reference to FIG. 2 hereinafter. FIG. 2 is an enlarged and fragmentary cross-sectional view of the first embodiment of the drive power transmission apparatus 1.

As shown in FIG. 2, the composite planetary gear apparatus 3 comprises a first planetary gear assembly 11 for use in the speed reduction of the drive motor 5, and a second planetary gear assembly 12 having a distribution function to distribute the drive power from the engine 8 to the motor generator 6 and the counter drive gear 13. The first planetary gear assembly 11 and the second planetary gear assembly 12 respectively have a ring gear R1 and a ring gear R2 which are integrally connected by a counter drive gear 13. The ring gear R1 and the ring gear R2 respectively constitute a first outer ring member and a second outer ring member which are integrally connected by an integral outer ring member as defined in the invention.

More specifically, the first planetary gear assembly 11 comprises a sun gear S1, the ring gear R1 surrounding the sun gear S1 and having inner teeth, a plurality of pinion gears P1 circumferentially equally spaced apart from one another around the sun gear S1 and held in mesh with the sun gear S1 and the ring gear R1, and a carrier Cr1 rotatably supporting the pinion gears P1 and secured to the case 22. The rotor 62 has one axial end portion close to the engine 8 and the other axial end portion remote from the engine 8. The sun gear S1 is splined to the one axial end portion of the rotor 62 of the drive motor 5 so that the sun gear S1 can be rotated together with the rotor 62.

The carrier Cr1 has a pair of annular plate portions 31a and 31b axially spaced apart from each other and positioned at the both axial ends of the pinion gears P1, and a plurality of column support portions 32 integrally connecting the annular plate portions 31a and 31b. The annular plate portion 31a of the carrier Cr1 close to the drive motor 5 has a peripheral portion provided with a plurality of projections 37 axially projecting for stopping the carrier Cr1 from being rotated. This means that the carrier Cr1 is secured to the case 22.

The second planetary gear assembly 12 comprises a sun gear S2, the ring gear R2 surrounding the sun gear S2 and having inner teeth, a plurality of pinion gears P2 circumferentially equally spaced apart from one another around the sun gear S2 and held in mesh with the sun gear S2 and the ring gear R2, and a carrier Cr2 rotatably supporting the pinion gears P2 and securely connected to the input shaft 15. The input shaft 15 and the rotor 72 respectively have one axial end portions close to the engine 8 and the other axial end portions remote from the engine 8. The sun gear S2 is splined to the other axial end portion of the rotor 72 so that the sun gear S2 can be rotated together with the rotor 72.

The carrier Cr2 has a pair of annular plate portions 35a and 35b axially spaced apart from each other and positioned at the both axial ends of the pinion gears P2, and a plurality of column support portions 36 integrally connecting the annular plate portions 35a and 35b.

The counter drive gear 13 is constituted by the ring gear R1 and the ring gear R2 axially arranged with each other. In other words, the ring gear R1 and the ring gear R2 are integrally formed to constitute as a whole the counter drive gear 13 surrounding the pinion gears P1 of the first planetary gear assembly 11 and the pinion gears P2 of the second planetary gear assembly 12.

The counter drive gear 13 has an inner peripheral surface portion formed with an annular groove 13a circumferentially formed at its axial portion, such as for example its axially intermediate portion of the ring gear R1 and the ring gear R2. The annular groove 13a is in the form of a rectangular shape in cross-section taken in the axial direction of the first and second planetary gear assemblies 11 and 12. The annular groove 13a has a bottom surface and a pair of side surfaces connected to the bottom surface at their respective corner portions.

The counter drive gear 13 has an outer peripheral surface portion formed with an annular bulged portion 13b radially outwardly projecting. The annular bulged portion 13b is formed with outer teeth which collectively constitute the counter drive gear 13.

The counter drive gear 13 has an inner peripheral surface defining a closed space A1 together with the constitution parts and elements forming the first planetary gear assembly 11 and the second planetary gear assembly 12. More, specifically, the first sun gear S1, the first pinion gears P1, the carrier Cr1, and the ring gear R1 of the first planetary gear assembly 11 and the second sun gear S2, the second pinion gears P2, the carrier Cr2, and the ring gear R2 of the second planetary gear assembly 12 collectively defining the closed space A1.

The counter drive gear 13 has a peripheral wall portion formed with a plurality of through bores 13c radially extending. The through bores 13c are circumferentially equi-distantly arranged, each having one end, i.e., a radially inner end opened at the bottom surface of the annular groove 13a of the counter drive gear 13 and the other end, i.e., a radially outer end opened at the outer peripheral surface of the annular bulged portion 13b of the counter drive gear 13, i.e., the bottom surface 13d between two adjacent teeth of the counter drive gear 13 to ensure that the closed space A1 is held in communication of the outer space A2 surrounding the counter drive gear 13 through the through bores 13c. The radially inner end of each of the through bores 13c is preferably opened at the axially intermediate position of the annular groove 13a.

The oil stirring operation to be performed by the composite planetary gear apparatus 3 will be explained hereinafter with reference to FIG. 3.

FIG. 3 is an enlarged and fragmentary cross-sectional view of FIG. 2 for explaining the oil stirring operation to be carried out in the first embodiment of the composite planetary gear apparatus according to the present invention.

In the composite planetary gear apparatus 3 shown in FIG. 3, the closed space A1 in the counter drive gear 13 is firstly supplied with oil from the oil pump 7 and the catch tank 79 as shown by the arrows F1 and F2. The oil thus supplied is then radially outwardly urged toward the inner peripheral surface of the counter drive gear 13 by a centrifugal force generated as the composite planetary gear apparatus 3 is operated. The oil thus radially outwardly urged is then collected in the annular groove 13a, occupying the radially outermost surface portion among the inner peripheral surfaces of the counter drive gear 13.

The oil thus collected in the annular groove 13a is then flowed into the through bores 13a as shown by the arrows F1 and F2 in FIG. 3 since the radially inner ends of the through bores 13a are opened at the axially intermediate inner peripheral surface portion of the bottom surface of the annular groove 13a formed on the inner peripheral surface portion of the counter drive gear 13. The oil thus flowed into the through bores 13a is then discharged to the outer space A2 of the counter drive gear 13 through the through bores 13a as shown by the arrow F3 in FIG. 3.

From the previously mentioned fact, it will be understood that the radially inner end of each of the through bores 13a opened at the axially intermediate inner peripheral surface portion of the bottom surface of the annular groove 13a causes the oil to be radially outwardly urged toward the inner peripheral surface of the counter drive gear 13 and collected in the annular groove 13a by the centrifugal force generated with the operation of the composite planetary gear apparatus 3, thereby making it possible to effectively discharge the oil to the outer space A2 of the counter drive gear 13 from the closed space A1 in the counter drive gear 13.

The fact that the radially outer end of each of the through bores 13c is opened at the outer peripheral surface of the annular bulged portion 13b of the counter drive gear 13, i.e., the bottom surface 13d between two adjacent teeth of the counter drive gear 13 leads to the fact that the oil passing through the through bores 13c is imparted an augmented large centrifugal force, thereby making it possible for a larger amount of oil to be discharged.

As explained in the foregoing description, the composite planetary gear apparatus 3 according to the first embodiment of the present invention comprises a counter drive gear 13 formed with a plurality of through bores 13c allowing the closed space A1 formed by the first planetary gear assembly 11 and the second planetary gear assembly 12 to be held in communication with the outer space A2 of the counter drive gear 13.

The communication through the through bores 13c between the closed space A1 defined by the first planetary gear assembly 11 and the second planetary gear assembly 12 and the outer space A2 outside of the counter drive gear 13 makes it possible to discharge the oil fed to the composite planetary gear apparatus 3 and accumulated in the closed space A1 to the outer space A2 of the counter drive gear 13 by way of the through bore 13c with the centrifugal force generated with the operations of the first planetary gear assembly 11 and the second planetary gear assembly 12 so that the oil is prevented from being accumulated in the closed space A1. This means that the composite planetary gear apparatus 3 is by no means affected with the oil resistance to prevent the stirring loss from being increased and thus to prevent the fuel efficiency from being lowered.

Second Embodiment

Figure 4:
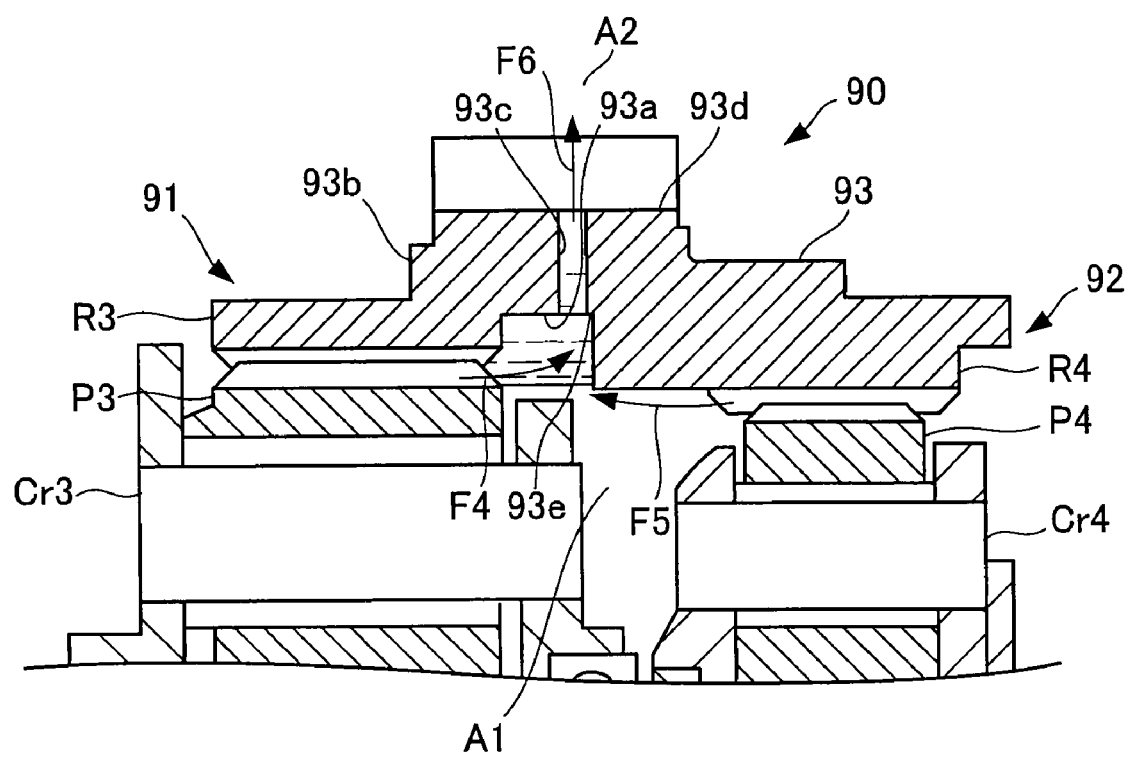
FIG. 4 is an enlarged and fragmentary cross-sectional view similar to FIG. 3 for explaining the oil stirring operation to be carried out in the second embodiment of the composite planetary gear apparatus according to the present invention.
Figure 5:
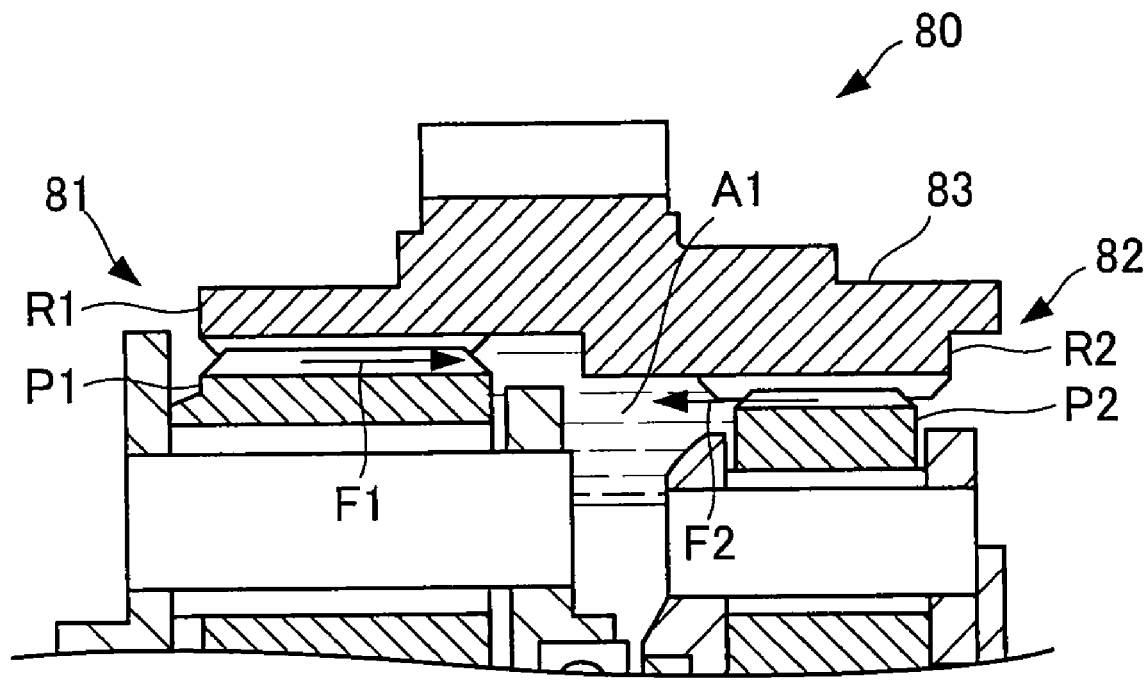
FIG. 5 is an enlarged and fragmentary cross-sectional view similar to FIGS. 3 and 4 but showing a conventional composite planetary gear apparatus having no through bore like the through bores formed in the counter drive gear forming part of the composite planetary gear apparatus according to the present invention.

FIG. 4 is an enlarged and fragmentary cross-sectional view similar to FIG. 3 for explaining the oil stirring state to be carried out in the second embodiment of the composite planetary gear apparatus according to the present invention.

The composite planetary gear apparatus 90 according to the second embodiment of the invention comprises sun gears not shown, pinion gears P3, P4, and ring gears R3, R4 which respectively constitute a first planetary gear assembly 91 and a second planetary gear assembly 92. The sun gears, the pinion gears P3, P4, and the ring gears R3, R4 of the first planetary gear assembly 91 and the second planetary gear assembly 92 are entirely the same in construction as the sun gears S1, S2, the pinion gears P1, P2, and the ring gears R1, R2 of the first planetary gear assembly 11 and the second planetary gear assembly 12 in the first embodiment of the composite planetary gear apparatus 3 shown in FIGS. 1 to 3.

However, the shapes of the sun gears, the pinion gears P3, P4, and the ring gears R3, R4 of the first planetary gear assembly 91 and the second planetary 92 and the positions of the through bores 93c in the second embodiment of the composite planetary gear apparatus 90 are different from the shapes of the sun gears S1, S2, the pinion gears P1, P2, and the ring gears R1, R2 of the first planetary gear assembly 11 and the second planetary gear assembly 12 and from the positions of the through bores 13c in the first embodiment of the composite planetary gear apparatus 3.

Therefore, the parts and elements forming the second embodiment of the composite planetary gear apparatus 90 same as those of the first embodiment of the composite planetary gear apparatus 3 respectively bear reference numerals and legends same as those of the first embodiment of the composite planetary gear apparatus 3, and thus only the different parts and elements of the second embodiment of the composite planetary gear apparatus 90 will be described in detail hereinafter.

As shown in FIG. 4, the sun gears, the pinion gears P3, P4, and the ring gears R3, R4 of the first planetary gear assembly 91 and the second planetary 92 in the second embodiment of the composite planetary gear apparatus 90 are each in the form of a helical shape, i.e., made from a helical gear to reduce vibrations and noises to be generated in the composite planetary gear apparatus 90. The annular groove 93a is in the form of a rectangular shape in cross-section taken in the axial direction of the first planetary gear assembly 91 and the second planetary gear assembly 92 and thus has a bottom surface and a pair of side surfaces connected to the bottom surface at their respective corner portions 93e. One end, i.e., the radially inner end of each of the through bores 93c is opened around or in the vicinity of any one of the corner portions 93e while the other end, i.e., the radially outer end of each of the through bores 93c is opened at the outer peripheral surface of the annular bulged portion 93b of the counter drive gear 93, i.e., the bottom surface 93d between two adjacent teeth of the counter drive gear 93.

The pinion gears P3 and P4 of the composite planetary gear apparatus 90 are each made from a helical gear so that the oil flowed into the closed space A1 in the counter drive gear 93 from the oil pump 7 and the catch tank 79 as shown by the arrows F4 and F5 in FIG. 4 is scooped up in the radially outward and axially inclined direction by the centrifugal force at the time of the rotations of the pinion gears P3 and P4 and then collected in the vicinity of the corner portion 93e of the annular groove 93a.

The oil thus collected in the vicinity of the corner portion 93e of the annular groove 93a is then flowed into the opening of each of the through bores 93c as shown by the arrow F6 in FIG. 4, and then discharged to the outer space A2 of the counter drive gear 93 through the through bores 93c as shown by the arrow F6 in FIG. 4.

As explained in the foregoing description, the composite planetary gear apparatus 90 according to the second embodiment of the present invention comprises pinion gears P3, P4 each in the form of a helical gear, and a counter drive gear 93 formed with a plurality of through bores 93c having an radially inner end opened at the corner portion 93e between the bottom surface and the side surface of the annular groove 93a so that the oil is easily collected in the vicinity of the corner portion 93e of the annular groove 93a, and effectively discharged to the outer space A2 of the counter drive gear 93 through the through bores 93c.

While there has been described in the foregoing description about the composite planetary gear apparatus according to the second embodiment of the present invention that the gears of the first planetary gear assembly 91 and the second planetary gear assembly 92 are each in the form of a helical gear, either the first planetary gear assembly 91 or the second planetary gear assembly 92 may comprise gears each in the form of a helical gear according to the present invention. In other words, at least one planetary gear assembly 91 or 92 is selected from among the first planetary gear assembly 91 and the second planetary gear assembly 92, the sun gear, the pinion gears, and the inner teeth of the selected planetary gear assembly being each formed by a helical gear, the annular groove 93a being in the form of a rectangular shape in cross-section taken in the axial direction of the first and second planetary gear assemblies 91 and 92 to have a bottom surface and a pair of side surfaces connected to the bottom surface at their respective corner portions 93e, and one end of each of the through bores 93 being opened in the vicinity of one of the corner portions 93e.

Although the above description has been made about the annular groove formed on the inner peripheral surface portion of each of the counter drive gears 13 and 93, the annular groove may be replaced by any other shaped grooves, such as for example a V-shape and a half circle shape, each of which has a cross-sectional shape easy to have the oil accumulated therein according to the present invention.

Though the annular groove having a cross-section in the form of a rectangular shape has been described to be formed on the inner peripheral surface portion of each of the counter drive gears 13 and 93, each of the counter drive gears 13 and 93 of composite planetary gear apparatus according to the present invention may be formed with a plurality of grooves having any shape of cross-section and circumferentially equi-distantly on and along the inner peripheral surface portion thereof.

The composite planetary gear apparatuses according to the first and second embodiments of the present invention have been explained in the above descriptions as the composite counter drive gears 13 and 93 having respective peripheral wall portions formed with a plurality of through bores 13c and 93c which are preferably circumferentially equi-distantly arranged. However, the through bores 13c and 93c are not necessarily required to be arranged circumferentially equi-distantly. For example, the through bores 13c and 93c may be arranged in circumferentially staggered relationship with one another according to the present invention.

Each of the through bores 13c and 93c has been explained as having one end, i.e., a radially inner end opened at the inner peripheral surface of each of the counter drive gears 13, 93 and the other end, i.e., a radially outer end opened at the outer peripheral surface of each of the annular bulged portions 13b, 93b of the counter drive gears 13, 93, i.e., the bottom surfaces 13d, 93d between two adjacent teeth of the counter drive gears 13, 93 to ensure that the closed spaces A1 are held in communication of the outer spaces A2 surrounding the counter drive gears 13, 93 through the through bores 13c, 93c. However, the radially inner end of each of the through bores 13c, 93c may preferably be opened at each of the axially intermediate positions of the annular grooves 13a, 93a according to the present invention.

The composite planetary gear apparatuses according to the first and second embodiments of the present invention have been explained with the through bores 13c and 93c each having a radially inner end opened at each of the bottom surfaces of the annular grooves 13a and 93a and a radially outer end opened at each of the outer peripheral surfaces of the annular bulged portions 13b and 93b of the counter drive gears 13 and 93, i.e., the bottom surfaces 13d and 93d between two adjacent teeth of the counter drive gears 13 and 93, however, the through bores 13c and 93c may be formed at any positions of the counter drive gears 13 and 93 if the through bores 13c and 93c are formed to have the closed space A1 held in communication with the outer space A2 of the counter drive gears 13 and 93. For example, the counter drive gears 13 and 93 may be formed with the through bores 13c and 93c, respectively, opened at the radially outer ends of the teeth, i.e., the radially outermost ends of the outer peripheral surfaces of the counter drive gears 13 and 93.

The previously mentioned composite planetary gear apparatuses according to the first and second embodiments of the present invention are merely raised as examples for explaining the spirit of the present invention, however, are not limited to those examples in the present invention. The scope of the present invention is required to be defined and construed in accordance with the claims with reference to the above examples. It is, therefore, intended for the claims to cover all the equivalents to the parts and elements as defined in the claims.

From the foregoing description, it will be understood that the composite planetary gear apparatus according to the present invention can bring about an advantageous effect to prevent fuel efficiency from being lowered stemming from the increased stirring loss of oil. This means that the composite planetary gear apparatus according to the present invention is useful especially for a composite planetary gear apparatus having two planetary gear assemblies combined together.

What is claimed is:

1. A composite planetary gear apparatus, comprising:
a first planetary gear assembly including a first sun gear, a plurality of first pinion gears held in mesh with said first sun gear, and a first outer ring member having inner teeth held in mesh with said first pinion gears;
a second planetary gear assembly including a second sun gear arranged in axial alignment with said first sun gear, a plurality of second pinion gears held in mesh with said second sun gear, and a second outer ring member having inner teeth held in mesh with said second pinion gears; and
an integral outer ring member including said first outer ring member and said second outer ring member, the integral outer ring member surrounds said first pinion gears and said second pinion gears and is surrounded by an outer space, wherein an inner peripheral surface of said integral outer ring member includes the first outer ring member, the second outer ring member, and an annular groove between the first outer ring member and the second outer ring member, an outer peripheral surface of said integral outer ring member includes counter drive gear teeth, a plurality of through bores radially extend from the annular groove, said first planetary gear assembly and said second planetary gear assembly collectively define a closed space held in communication with said outer space through said through bores, and oil from the first pinion gears and the second pinion gears is urged radially outwardly toward the first outer ring member and second outer ring member, respectively, this oil is collected in the annular groove and is discharged through the through bores to lubricate the counter drive gear teeth.

2. A composite planetary gear apparatus as set forth in claim 1, wherein the through bores are circumferentially equidistantly arranged.

3. A composite planetary gear apparatus as set forth in claim 1, wherein an end of each of said through bores is opened at the radially outermost position in the outer peripheral surface of said integral outer ring member.

4. A composite planetary gear apparatus as set forth in claim 1, wherein:
the outer peripheral surface of the integral outer ring member includes an annular bulged portion that extends radially outward, and
the annular bulged portion includes the counter drive gear teeth.

5. A composite planetary gear apparatus as set forth in claim 4, wherein the through bores have a first end opened at a bottom surface of the annular groove and a second end opened at the annular bulged portion between two adjacent teeth of the counter drive gear teeth.

6. A composite planetary gear apparatus as set forth in claim 1, wherein each of said through bores have one end opened at a bottom surface of said annular groove and an other end opened at the outer peripheral surface of said integral outer ring member.

7. A composite planetary gear apparatus as set forth in claim 6, wherein:
at least one planetary gear assembly is selected from among said first planetary gear assembly and said second planetary gear assembly, said sun gear, said pinion gears, and said inner teeth of said selected planetary gear assembly being each formed by a helical gear,
said annular groove being in the form of a rectangular shape in cross-section taken in the axial direction of said first and second planetary gear assemblies to have a bottom surface and a pair of side surfaces connected to said bottom surface at their respective corner portions, and
one end of each of said through bores being opened in the vicinity of one of said corner portions.

8. A composite planetary gear apparatus as set forth in claim 7, wherein the helical gear is formed so that the oil flowed into the closed space is scooped up in the radially outward and axially inclined direction by the centrifugal force at the time of the rotations of said first and second pinion gears and then collected in the vicinity of the corner portions of the annular groove.

9. A composite planetary gear apparatus, comprising:
a first planetary gear assembly including a first sun gear, a plurality of first pinion gears held in mesh with said first sun gear, and a first outer ring member having inner teeth held in mesh said first pinion gears;
a second planetary gear assembly including a second sun gear arranged in axial alignment with said first gear, a plurality of second pinion gears held in mesh with said second sun gear, and a second outer ring member having inner teeth held in mesh with said second pinion gears; and
an integral outer ring member including said first outer ring member and said second outer ring member, the integral outer ring member surrounds said first pinion gears and said second pinion gears and is surrounded by an outer space, wherein
an inner peripheral surface of said integral outer ring member includes the first outer ring member, the second outer ring member, and a plurality of grooves between the first outer ring member and the second outer ring member,
the grooves are formed circumferentially equidistantly on and along the inner peripheral surface,
an outer peripheral surface of said integral outer ring member includes counter drive gear teeth,
a plurality of through bores radially extend from the grooves, respectively,
said first planetary gear assembly and said second planetary gear assembly collectively define a closed space held in communication with said outer space through said through bores, and
oil from the first pinion gears and the second pinion gears is urged radially outwardly toward the first outer ring member and second outer ring member, respectively, this oil is collected in the grooves and is discharged through the through bores to lubricate the counter drive gear teeth.

* * * * *